(12) United States Patent
Hanscom (10) Patent No.: US 7,411,504 B2
(45) Date of Patent: Aug. 12, 2008

(54) MOTION-RESPONSIVE KOI POND PREDATOR DETERRENT SYSTEM AND ENTERTAINMENT DEVICE

(76) Inventor: Eric Alan Hanscom, 6994 El Camino Real, Suite 204, Carlsbad, CA (US) 92009

( * ) Notice: Subject to any disclaimer, the term of this patent is extended or adjusted under 35 U.S.C. 154(b) by 805 days.

(21) Appl. No.: 10/971,583

(22) Filed: Oct. 23, 2004

(65) Prior Publication Data
US 2006/0119482 A1    Jun. 8, 2006

(51) Int. Cl.
*G08B 13/14* (2006.01)
(52) U.S. Cl. ............... 340/572.3; 340/573.1; 340/384.2
(58) Field of Classification Search ............. 340/573.2, 340/573.1, 384.2
See application file for complete search history.

(56) References Cited

U.S. PATENT DOCUMENTS

| | | | | |
|---|---|---|---|---|
| 5,450,063 A | * | 9/1995 | Peterson et al. | 340/573.2 |
| 5,892,446 A | * | 4/1999 | Reich | 340/573.1 |
| 5,966,075 A | * | 10/1999 | Blanks | 340/573.2 |
| 7,025,655 B2 | * | 4/2006 | Chase | 446/573.1 |
| 7,255,060 B2 | * | 8/2007 | Grandy | 116/22 A |
| 2004/0119058 A1 | | 6/2004 | Burdick | |
| 2004/0169585 A1 | * | 9/2004 | Smith et al. | 340/384.2 |

OTHER PUBLICATIONS

User's manual sent along with a "Gator Guard" applicant/attorney purchased for his personal koi pond.
Advertisement on EBay for Floating Pelican.
Advertisement on EBay for Floating Alligator.
Advertisement taken from internet on "Scarecrow—Motion Activated Sprinkler".

* cited by examiner

*Primary Examiner*—Jeff Hofsass
*Assistant Examiner*—Edny Labbees
(74) *Attorney, Agent, or Firm*—Eric Hanscom (57) ABSTRACT

This invention is directed toward a series of devices designed to scare away Great Blue Herons, raccoons, and other common koi pond predators through a combination of a motion detection system which triggers an auditory and/or movement response from a variety of common enemies of koi pond predators and fanciful creatures intended to frighten koi predators. The invention teaches the combination of the motion detector with the koi predator enemy replica, such that a koi pond user can economically and efficiently protect his/her pond without adversely impacting the visual appeal of a koi pond.

21 Claims, 7 Drawing Sheets

MOTION-RESPONSIVE KOI POND PREDATOR DETERRENT SYSTEM AND ENTERTAINMENT DEVICE

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

This invention is directed toward a series of devices designed to scare away Great Blue Herons, raccoons, and other common koi pond predators through a combination of a motion detection system which triggers an auditory and/or movement response from a variety of replicas of common enemies of koi pond predators. The invention teaches the combination of the motion detector with the koi predator enemy replica, such that a koi pond user can economically and efficiently protect a koi pond without adversely impacting the visual appeal of a koi pond.

People have been keeping koi and other ornamental fishes as pets for centuries. One of the more popular methods of keeping koi is to place them in an outdoor pond. Ponds, ranging in size from several feet across to several acres, can be constructed anywhere the air temperature allows the fish to survive winter temperatures.

While koi ponds have proven to be one of the more attractive ways to keep koi, there are inherent problems with locating large numbers of colorful, and therefore easily seen, fish in an exposed, frequently shallow, outdoor pond. Predators such as raccoons and herons can empty a koi pond in less than an hour, consuming, in the case of valuable species, hundreds or thousands of dollars worth of fish in one feeding session.

Repelling these predators has become a major concern for koi pond owners. Among the methods used in past have been plastic animals, wire systems, and netting systems. The least expensive method is to put a plastic replica of a natural enemy of the herons and raccoons near the pond, with the hope that the plastic animal will deter the raccoon or heron from approaching the pond. Most popular among these are plastic great horned owls, available at many hardware and home improvement stores, which are placed around the pond, in a tree overlooking the pond, or on a roof above the pond. Also being used are plastic alligator heads, which float on the surface of the water, and floating pelicans, although it is questionable how many koi predators would be deterred by a pelican. Disadvantages of plastic replicas include the fact that because they don't move, particularly in response to a movement of the predator, the predator can become accustomed to the presence of the predator replica. Another disadvantage is that there are such a limited number of natural enemies of koi predators, there is a danger that the replica a koi pond owner buys will not be seen by the koi predator as a danger. For example, it is questionable whether a Great Blue Heron in California would recognize a plastic alligator as a natural enemy, since there are no naturally occurring alligators west of the Mississippi. A final disadvantage is that the plastic replicas are often not realistically painted so that a koi predator, given the time to examine the replica, could determine that the replica was indeed a fake animal. The time a koi predator has to examine the replica is key; if the predator is scared away before it can examine the replica, the replica can serve as an effective deterrent for generations of koi predators. If a koi predator has enough time to assess the enemy replica and determine it presents no threat, this fact can be passed on to its young and within several generations the enemy replica can become virtually useless as a deterrent.

Another approach to protecting a pond is to prevent or inhibit access to the pond by koi predators. One such approach is a wire system, involving a series of wires cross-linked above the pool, such as that found in US Patent application 20040119058 to Burdick (2004). The main disadvantage of wire systems are visual impairment and access limitations. Even though these inventions use thin wire, there still remains a series of wires across the pond, which detracts from the visual appeal of the colorful fish swimming beneath the wires. The wire systems can also inhibit the ability of a pool owner to access the pond to tend water plants, clean a filter, or even feed the fish. Additionally, many of the common plastic liner ponds allow a user to catch the fish and put them in a bucket, then drain the pond, remove it from its hole, and clean it before reinserting it, filling it with water, and putting the fish back in. A wire system would have to be taken down before such actions, thereby adding to the inconvenience factor in cleaning a pond. A final problem presented by wire systems is the chance that a koi predator, particular a heron, egret or other large bird, will become entangled in the wire and die or injure itself. Most koi owners wish no harm on the koi predators—which are just trying to eat—and would prefer to use a system which does not harm the predators. Additionally, a homeowner may run afoul of fish and wildlife laws if a protected animal dies or is injured in such a device.

Netting systems work on a principal similar to wire systems: a physical screen that keeps a koi predator from accessing the koi pond. Unlike the wire systems that are installed directly above and around the pond, netting systems are usually strung eight to twenty feet above the pond, and create a small "house" around the koi pond. Like the wire systems, netting systems are meant to be unobtrusive, and made from thin mesh netting that will withstand the rigors of an outdoor setting. Thin mesh will also cast as little shade as possible. At the same time, the shading provided by a netting system can inhibit the growth of pond plants, which usually do best in full sun, and should the screen be ripped during a windy day or rainstorm, the koi predators can gain easy access. Netting systems also pose the danger of entangling koi predators, which raise the same moral and legal problems as do wire systems.

Another approach used in the past is to have a motion detector trigger an "enemy replica" to move such that an animal will be scared away. The prior art discloses two inventions which combine motion detection with a response designed to frighten away animals. U.S. Pat. No. 4,450,063 to Peterson (1995) teaches a complex system of microwave, radar, or other signal generation and receiving arrangements which trigger responses, including noise, light, and motion from objects, including predator bird replicas, upon a bird's triggering the motion detection systems. This invention is directed toward a method of keeping birds from landing on a polluted pond or wetlands area, and is relatively complex and costly. It is also fairly fixed in place and although there is some flexibility in the computer-programmed responses, the system is not readily or economically adaptable to the home koi pond environment, where different situations and seasons may require the moving or rearranging of the predator enemy replicas.

The Scarecrow by Bird-X, a company specializing in bird repellant devices, is basically a sprinkler head hooked up to a pressurized water hose with a motion detector that, when detecting motion, opens a valve which releases a three-second burst of water intended to scare away koi predators. The Scarecrow, because it is hooked up to a pressurized water source, is subject to the leaks, burst washer gaskets, and exploding hoses that are inherent to a constantly pressurized system. Since there is a wide range of garden hoses, varying in quality from reinforced hoses that can withstand constant pressurization to cheaper models which balloon out, split, leak, and otherwise malfunction under any kind of extended water pressure, inventions such as The Scarecrow may result in substantial damage (and high water bills) due to malfunctioning of devices, such as hoses, upon which they rely. The Scarecrow is also designed such that the water jets out directly above the motion detector, thereby subjecting the internal electrical parts to potentially severe conditions should water seep inside of the motion detector. In addition, the Scarecrow could cause a burst of water to touch the koi predator, which in the case of a Great Blue Heron and other waterfowl, could be viewed by the US Department of Fish and Game or the state or local law enforcement divisions as a violation of the law. Finally, the Scarecrow also provides only one response—a three-second burst of water—which may allow some koi predators to become accustomed to it, thereby decreasing its effectiveness.

Thus there has existed a long-felt need for a self-contained, inexpensive invention which can scare away koi predators, not visually impair the enjoyment of the koi pond, or physically impair a user's ability to access the koi pond, and rely upon neither external hoses or other common garden items that are subject to wear and tear, nor complex and expensive computers and radar/microwave systems.

The current invention provides just such a solution by having a koi predator enemy replica which responds to the motions of the koi predator, thereby more accurately mimicking a real animal than those in the prior art. The invention also does not shade the pond, as does a netting system, nor does it result in visual impairment and physical limitations as does a wire system, and is fully self-contained, thereby making its arrangement.

SUMMARY OF THE INVENTION

It is a principal object of the invention to provide a method by which koi and other fish predators can be deterred from fish ponds that includes replica enemies of traditional koi pond predators such as raccoons and herons which can perform one or more actions when triggered to respond by a motion detector which has detected the predator and set in motion a logic chip's response which has, in turn, triggered a motor to cause the enemy replica response to occur.

It is another object of the invention that the enemy replicas be easily transported by a person and can be moved easily around a pond environment.

It is an additional object of the invention that the enemy replicas be attractive and realistic, both in their appearance and their responses, such that the invention not only frightens away koi predators, but also enhances the koi pond surroundings in an eye-pleasing manner.

It is a further object of the invention that the enemy replica responses can represent a large number of movements, sounds, and changes in appearance for a wide variety of enemy replicas.

It is an additional object of the invention that the responding movement of the enemy replica can be a movement of parts of the replica's body and/or a movement of the entire replica's body along a track which either completely encircles the pond or is a relatively straight line track which allows the replica to "charge out" from behind bushes or another screen and move at a rapid rate of speed directly toward the predator, then retreat back to its hiding place a short time after the predator triggers this particular type of movement.

It is also an object of this invention that the motion detection device can either be internally stored within the enemy replica, such that is detects movement within a certain angle to either side of the motion detection apparatus and at a certain distance in front of the motion detection apparatus, or located externally, as is done frequently with garage door openers, such that it detects movement across an invisible beam that lies between a beam emitting object and a beam receiving object, thereby allowing a user of the invention to custom tailor the location of the enemy replicas and the area scanned for motion.

It is an additional object of this invention to provide a multiple-sided enemy replica where two, three, or even four different "sides" to an enemy replica can be manufactured with different sides having different appearances, such as where the initial view of the enemy replica shows an owl with ears down and eyes shut, but when a koi predator trips the motion detection system, the owl rotates 90 degrees to show a different view of an owl with eyes open and ears up, and that if the motion detection system continues to be triggered by the presence of a koi predator, that the invention continues to turn and show new views of the enemy replica to the koi predator.

It is a further object of the invention that the enemy replica can make noises, both the noises one would naturally expect to come from that particular animal, and fanciful or computer-generated noises, which can either occur as an automatic response to detection of movement of a koi predator, or occur in a programmed or random sequence with the use of a computer chip or logic chip.

It is a final object of this invention to provide these replica movements and responses for uses other than protecting koi ponds, for example, Halloween and other festive occasions.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

FIG. 3 shows an owl with two sides, which are attached to each other by way of attachment points, such that the eventual item will be relatively flat when compare with the invention of FIG. 4. A motor hidden in the "fence post" section of the invention will spin the invention around.

FIG. 3 shows an owl with three sides, which are attached to each other such that the invention can be manufactured in one piece and then folded at the connection points and attached to form a three-sided item. It is understood that a four-sided iteration is also possible.

FIG. 10 is a front, elevational view of the iteration of FIG. 9 in its activated position. It should be noted that with this iteration as well as the others illustrated by the figures, the motions and actions can be triggered simultaneously by a simple turning on of a motor, or one or more at a time in a programmed or random sequence with the use of a computer chip or logic chip.

DETAILED DESCRIPTION OF THE FIGURES

Figure 1:
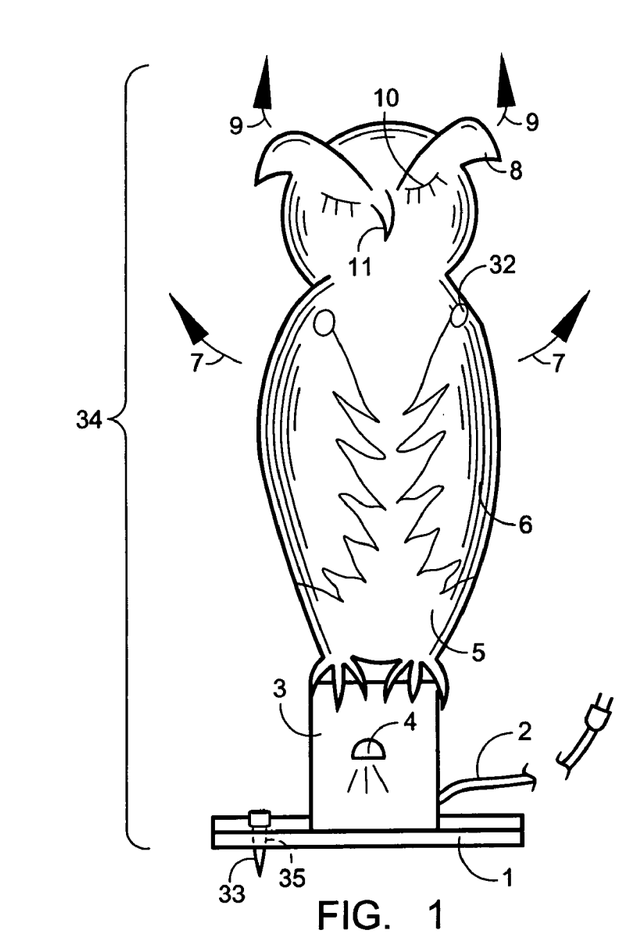
FIG. 1 is a front view of an iteration of the invention in which the enemy replica is an owl, showing the owl in its inactivated or resting position.

FIG. 1 is a front view of an iteration of the invention in which the enemy replica is an owl, showing the owl in its inactivated or resting position. The invention in this iteration is a single unit which comprises a base (1), a motion detector (4), a source of energy, in this figure shown as a cord/plug (2) which plugs into an electrical outlet, and a body (34). The base (1) can be weighted such that it stabilizes the body (34), preventing it from tipping over due to winds or even a bump from a koi predator. The base (1) can also be anchored into the ground with anchor devices (33) such as screws, nails, or stakes which have a head portion which is larger than a hole (35) in the base through which the anchor device fits. The motion detector (4) is, in this iteration, embedded into a portion of the body which is manufactured to resemble a fence post (3). Sitting upon the fence post (3) is, in this iteration, an owl (5), which comprises a body generally shaped like an owl, with several movable parts. Here, the owl has two eyes (10) than can open, a beak (11) that can open and emit sounds, two ears (8) which can move up in a direction indicated by (9), two wings (6) which can pivot about pivot points (32) in a direction indicated by (7) such that the wings swing out. These motions are accomplished by an internal motor and lever devices (not shown in this figure), the motor being powered by the source of energy, which in turn moves the internal levers which accomplish the desired movements. The invention optionally has a computer chip or other logic device which coordinates the detection of motion with the series and timing of the responses.

Figure 2:
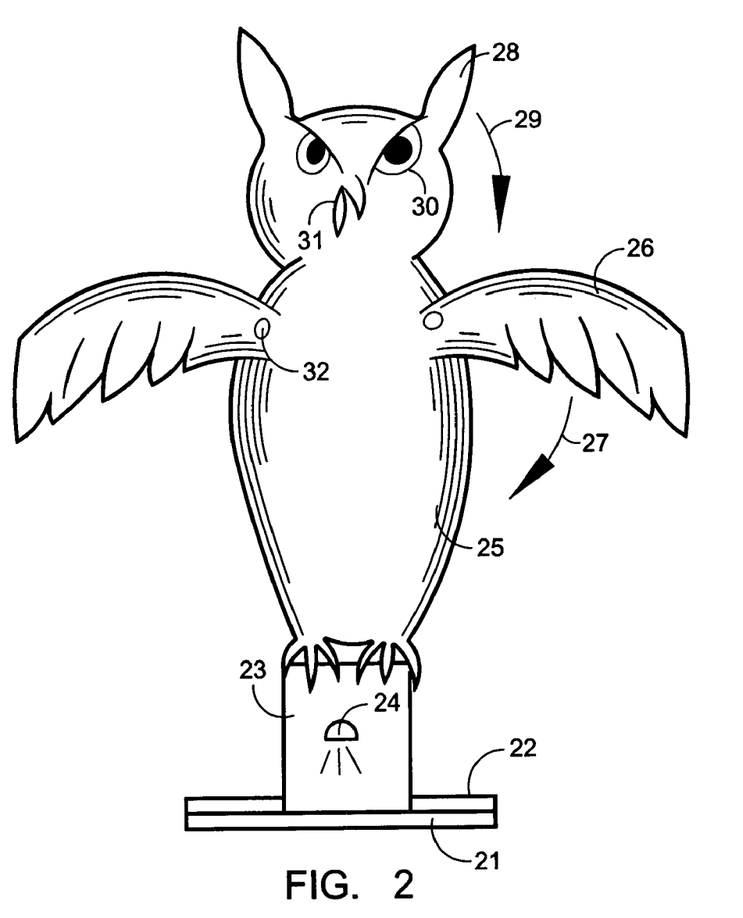
FIG. 2 is a front view of the owl of FIG. 1, showing a number of motions and actions the owl can take upon being activated by a koi predator passing through its motion detection field. It should be noted that the motions and actions can be triggered simultaneously, or one or more at a time in a programmed or random sequence.

FIG. 2 is a front view of the owl of FIG. 1, showing a number of motions and actions the owl can take upon being activated by a koi predator passing through its motion detection field. Again, the owl is used as an example of a koi predator that can be manufactured as an enemy replica, but this is not meant in any way to limit the invention to owls. It should be noted that the motions and actions can be triggered simultaneously, or one or more at a time in a programmed or random sequence through use of a computer chip or logic chip. Here, the enemy replica is shown in its activated portion. The base (21) in this iteration has one or more solar panels (22) which collect solar energy and convert it into usable energy which the invention uses to move its parts. The use of solar panels can be done in conjunction with the electrical outlet connection shown in FIG. 1, or done as the sole source of energy for the invention. The energy can be stored in a battery hidden inside a hollow section of the replica made to look like a fence post (23), which in this case also holds the motion detector (24). The owl (25) in its activated state has two eyes (30) which are open, a beak (31) which is open and can emit noise from a tape recorded playback device hidden within the body cavity of the owl, two ears (28) which are in an upright position, and can move back down in a direction indicated by (29) back to its inactive position, and two wings (26) which pivot about a pivot point (32) in an outward position. After a period of time passes, the wings (26) move back down in a direction indicated by number (27) back to the inactive position. The goal of the invention is that when a koi predator triggers the motion detector, the owl's appearance changes immediately in response to the movement of the koi predator. The motions can be all at once, sequential, or in a random sequence, and when a selected period of time passes, the active state can revert to an inactive state. The goal with this iteration of the invention along with the others taught by this patent is that the response of the enemy replica will be so sudden that a koi predator will be immediately frightened away and will not have adequate time to assess whether the enemy replica is a danger or harmless.

Figure 3:
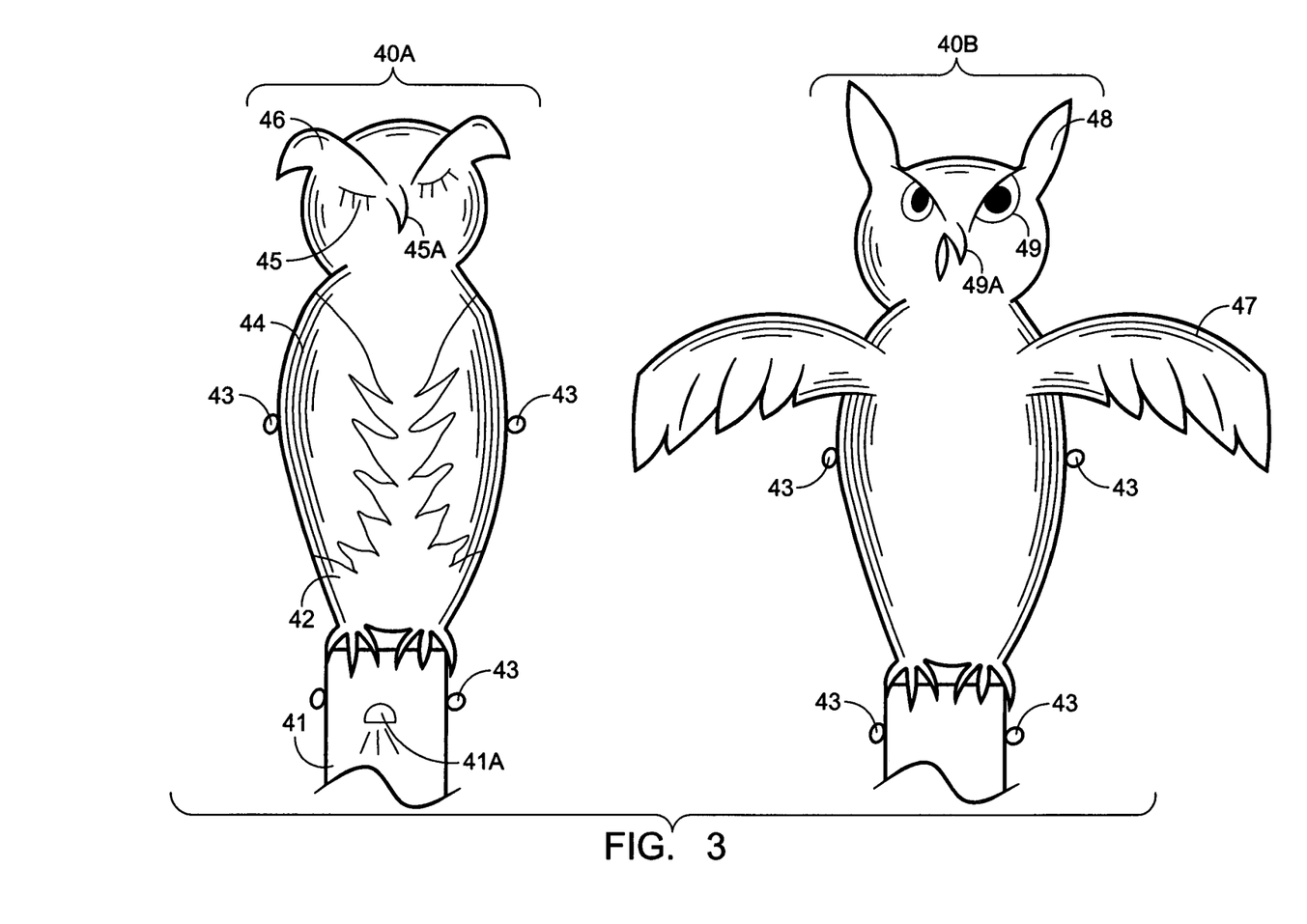
FIG. 3 is a front view of another iteration of the invention—a two-sided enemy replica—in this case an owl, in which the invention spins around to show a koi predator a "different look" upon having its motion detector triggered by movement of the koi predator.

FIG. 3 is a front view of another iteration of the invention—a two-sided enemy replica attached in a "back to back" manner at attachment points (43)—in this case an owl, in which the invention spins around to show a koi predator a "different look" upon having its motion detector triggered by a koi predator. FIG. 3 shows an owl with two sides, which are attached to each other by way of attachment points, such that the eventual item will be relatively flat when compare with the invention of FIG. 4. The owl (42) in its inactive side (40A) has two drooping ears (46), two closed eyes (45), one closed beak (45A), and two folded wings (44). The inactive side (45B) has two upright ears (48), two open eyes (49), one open beak (49A) which can, optionally, emit sound, and two upright wings (47). The inactive side (45A) and the active side (45B) are connected to each other at attachment points (43) which can be toggles, snaps, hooks, Velcro, simple loops through which string can be tied, or other means of attachment. The motion detector (41A) of motion triggers an internal motor hidden inside the fence post (41) or located below the fence post (not shown in this figure) which rotates the invention 180 degrees immediately upon sensing motion, which is intended to frighten the koi predator as the device spins around and shows the koi predator a "new look".

Figure 4:
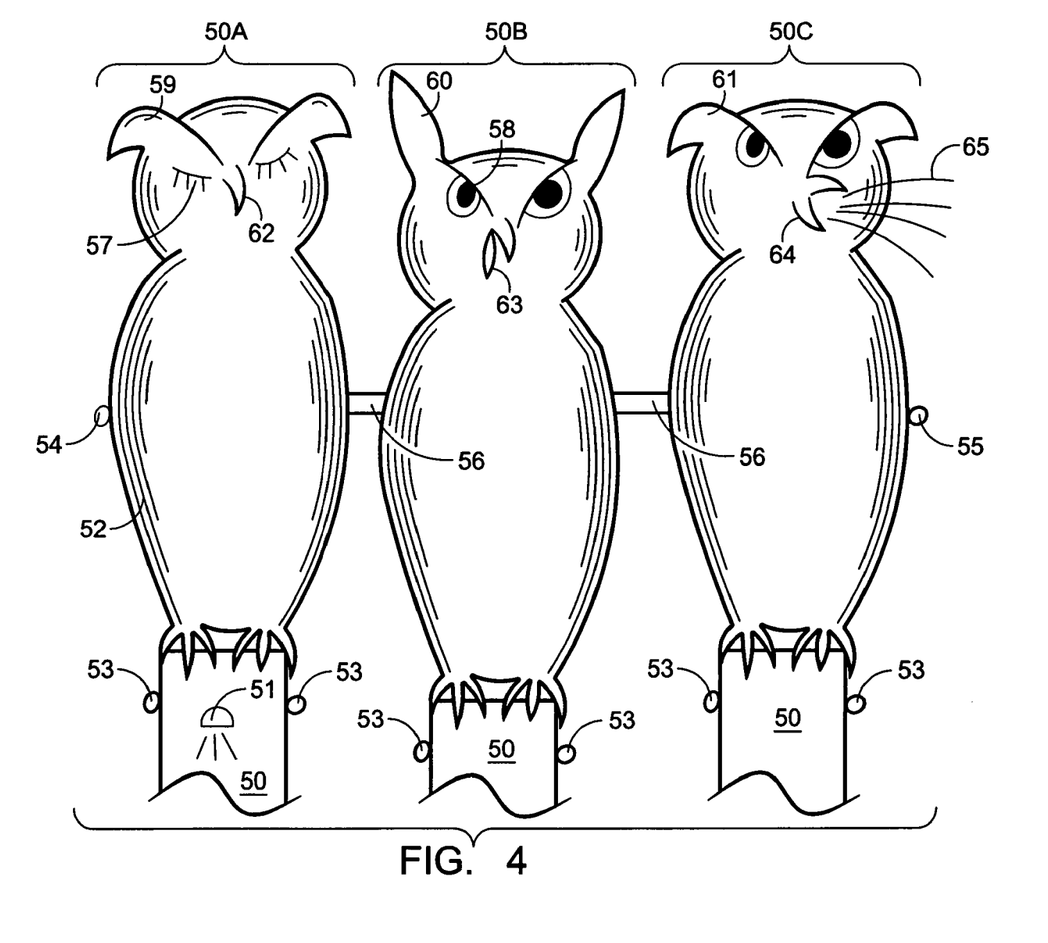
FIG. 4 is a front view of another iteration of the invention—a multiple-sided enemy replica—in this case a three-sided owl, in which the invention spins around to show a koi predator a "different look" upon having its motion detector triggered by a koi predator.

FIG. 4 is a front view of another iteration of the invention—a multiple-sided enemy replica—in this case a three-sided owl, in which the invention spins around to show a koi predator a "different look" upon having its motion detector triggered by a koi predator. FIG. 4 shows an owl with three sides, which are attached to each other such that the invention can be manufactured in one piece and then folded at the connection points (56) and attached at attachment points (53) to form a three-sided item, with a hook (55) and loop (54) which is used to close the invention in a hollow, triangular configuration. A motor (not shown in this figure) is hidden behind a plastic molded to appear as a fence post (50), which is molded in three pieces that connect together at attachment points (53). The owl body (52) has three different "looks" which are rotated in response to a koi predator triggering a motion detector (51). Each section of the molded plastic figure has an owl of different appearance. In this iteration, the inactive form (50A) has closed eyes (57), droopy ears (59), and a closed beak (62). When the motion detector is triggered, the invention rotates 120 degrees to expose a second side of the owl replica (50B), containing upright ears (60), open eyes (58), and an open beak (63). If the koi predator leaves immediately upon seeing the second owl, the logic chip can be programmed to have the invention turn back to its inactive phase (50A), or continue on the third phase (50C) in which the ears (61) are only half raised, the beak (64) is open, and emits a loud noise (indicated by number (65)). Should the koi predator continue to trigger the motion detector, the invention makes another 120 degree turn which exposes the third phase (50C).

Figure 5:
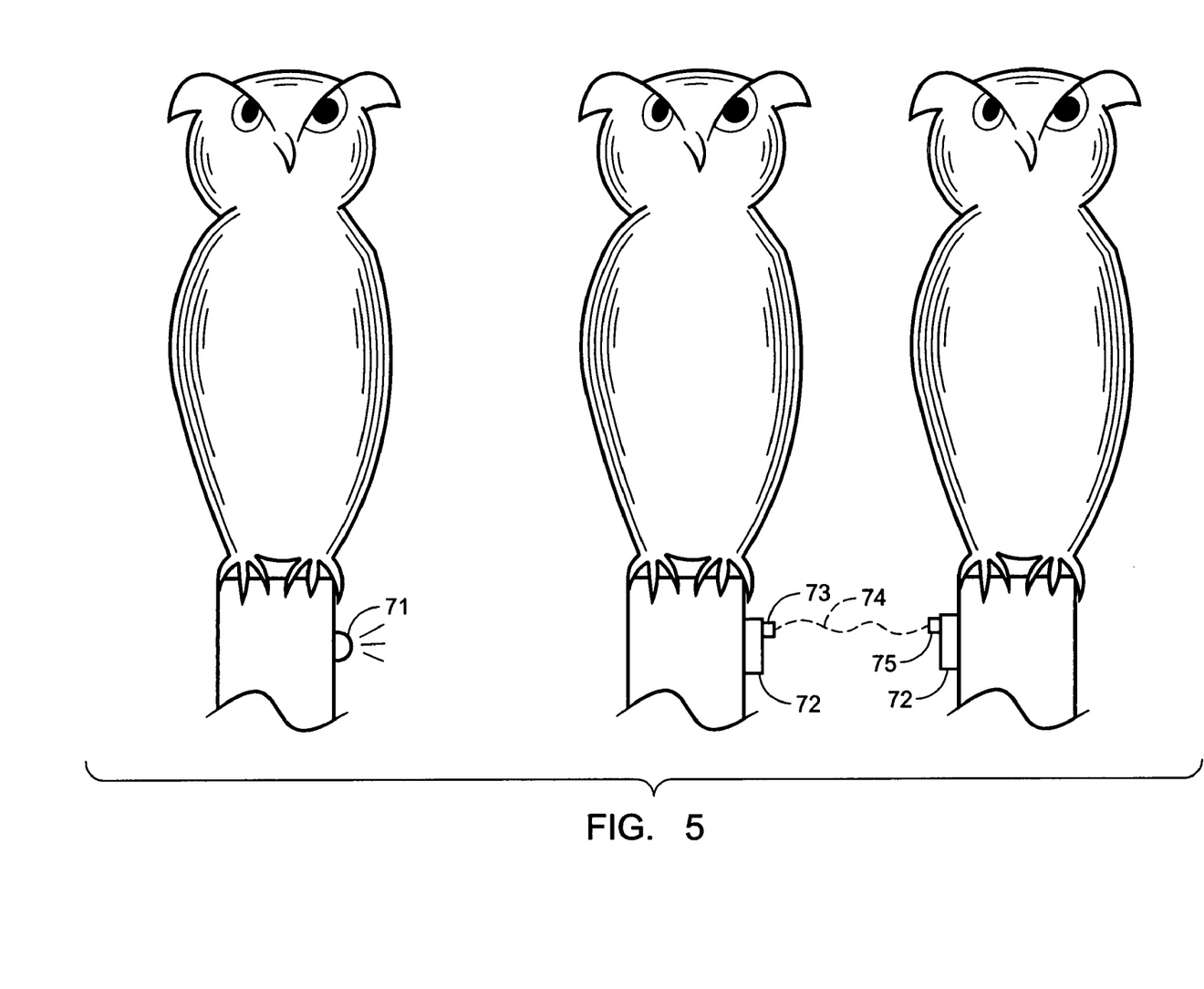
FIG. 5 is a front view of the two main types of motion detection systems envisioned by the invention: a single unit detection system in which a radiating-type motion detection system is built into the invention such that it detects motion a certain distance away from the unit within a certain angle extending from the motion detector, and a multiple until system in which a laser beam or other low-energy, triggering stimulus is emitted by one unit and received by another, such that there is an invisible line between the units which, when crossed by a koi predator, triggers a response from both units (and any others hooked up to the motion detecting units).

FIG. 5 is a front view of the two main types of motion detection systems envisioned by the invention: a single unit detection system (71) in which a radiating-type motion detection system is built into the invention such that it detects motion a certain distance away from the unit within a certain angle extending from the motion detector, and a multiple until system in which a laser beam (74) or other low energy triggering stimulus is emitted by one unit (72) with an emitting device (73) and received by another (72) with a receiving device (75), such that there is an invisible line between the units which, when crossed by a koi predator, triggers a response from both units (and any others hooked up to the motion detecting units).

Figure 6:
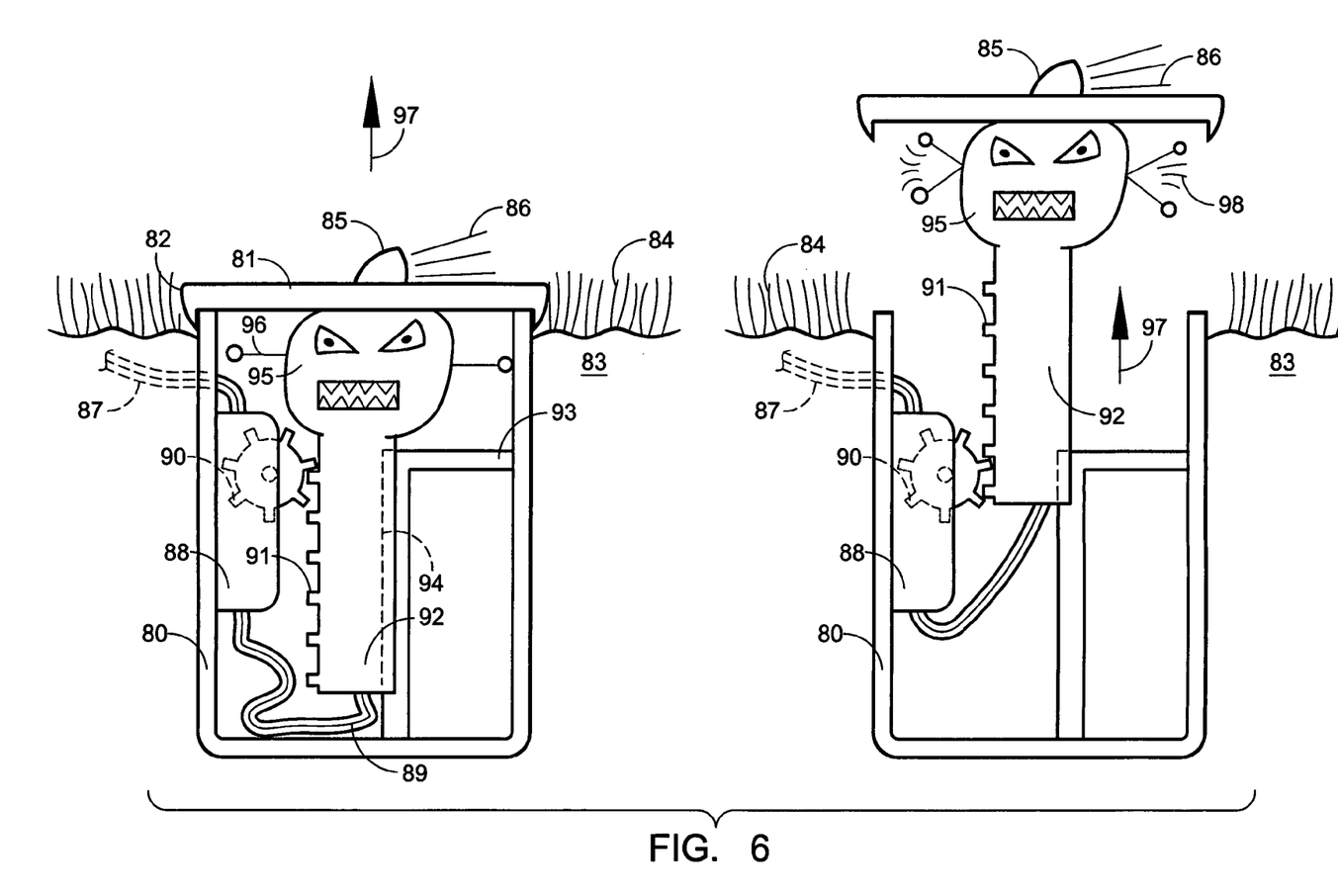
FIG. 6 is a side view of the invention showing an iteration where the motion detection system is located on top of the unit, which is hidden underground until triggered by motion of a koi predator to rise up out of the ground and perform a variety of actions in response to the presence of the koi predator. Note that because the enemy replica cannot be seen by a koi predator approaching the pond, or observing the pond from a distance, the koi predator cannot become accustomed to the enemy replica nor have enough time, once the enemy replica appears, to accurately assess whether it is truly a threat.

FIG. 6 is a side view of the invention showing an iteration where the motion detection system is located on top of the unit, which is hidden underground until triggered by motion of a koi predator to rise up out of the ground and perform a variety of actions in response to the presence of the koi predator. In this iteration of the invention, there is a container (80) which is embedded into the ground (83) such that a container top (81) fits over the sides of the container with a lip (82) which prevents water from seeping into the container and ruining the electrical system contained therein. On top of the container top (81) is a motion detector (85) which can be of a single, radiant detecting system (86) as shown in this figure, or as part of a multiple system arrangement as described in FIG. 5. The invention is designed to be unobtrusive, and can even blend in with the top of cut grass (84). There is a power source, in this case an electrical cable (87) running out to an AC outlet. Inside of the container, there is a motor (88) which turns a gear (90) which rises and lowers a plurality of matching gears (91) which raises a monster (95) in a direction (97) which can be a fanciful monster (as shown in this figure), or a realistic enemy replica. The monster (95) has antennae (96) which are flexible thin pieces of metal, plastic or a similar material with a solid end ball which will move (98) up and down when the monster is raised. The monster (95) slides up and down on a track (94) which is supported by supports (93) attached to the sides of the container (80). There is an electrical connector (89) which conveys signals from the motion detector (85) to the motor (88). Optionally, the motor (88) can contain a computer chip or logic chip which can coordinate the motion detection and movements of the monster (95). The monster (95) can optionally emit sound as well from a sound producing device wired into the motor (sound producing device not shown in this figure). The object of this iteration of the invention is to provide a sudden surprise to a koi predator from an underground monster or enemy replica that the koi predator cannot become accustomed to by merely staying near a koi pond over a prolonged period of time.

Figures 7, 8:
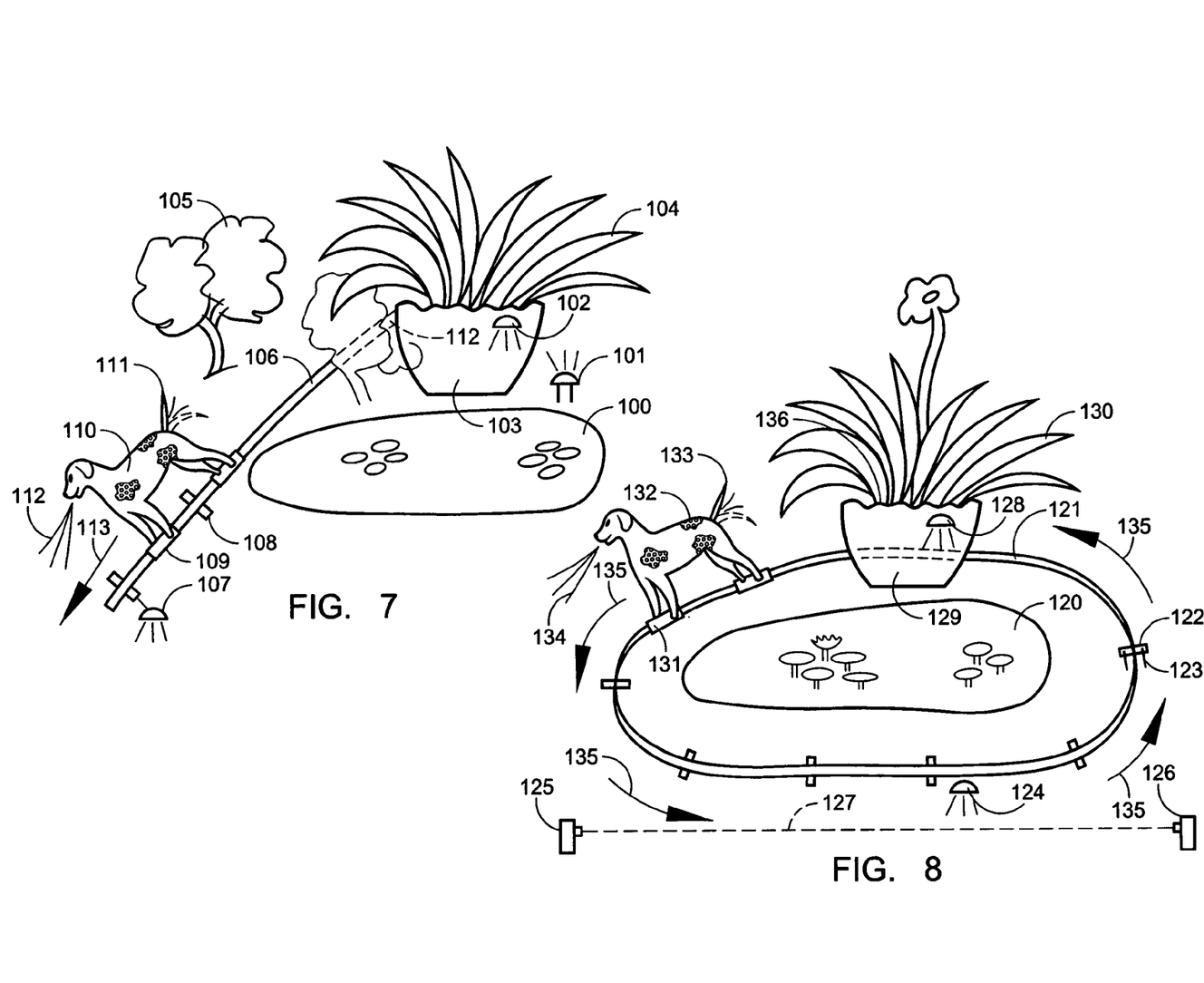
FIG. 7 is a front, elevational view of the invention showing an iteration of the invention in which the enemy replica charges out of bushes on a monorail or other solid, linear type or directional guide, to frighten a koi predator. Because the enemy replica is hidden behind a screen consisting of a combination of flower pots, lattice, vines and/or naturally occurring vegetation, the koi predator cannot become accustomed to the enemy replica nor have enough time, once the enemy replica appears, to accurately assess whether it is truly a threat.
FIG. 8 is a front, elevational view of the invention showing an iteration of the invention in which the enemy replica moves out from behind a screen created by potted plants or other vegetation when activated by the motion detector, on a monorail or other solid, linear type of directional guide, to frighten a koi predator, in which the invention circles around a pond on a track.

FIG. 7 is a front, elevational view of the invention showing an iteration of the invention in which the enemy replica charges out of bushes on a monorail or other solid, linear type of directional guide, to frighten a koi predator in response to the koi predator triggering a motion detection system. This figure, like FIG. 6, illustrates an iteration of the invention which is designed to hide the monster or enemy replica and suddenly surprise the koi predator when it triggers to motion detection system. By hiding the monster or enemy replica, there is much less chance that a koi predator which frequents a koi pond will become accustomed to the presence of the invention, thereby increasing its effectiveness as a surprise and deterrent to the koi predator. Here, the koi pond (100) is surrounded by motion detectors (101) placed in several locations. The motion detectors are connected by underground cables to a logic center, not shown in this figure, hidden behind a natural vegetation screen, comprised of some combination of potted plants (104) and/or plants planted in the ground (112). On the other side of the vegetation the user can plant more shielding plants (105) which help to hide the motor and the enemy replica (110) in its resting or inactive state from a variety of angles of sight. Hidden behind this screen is the enemy replica (110), in this case a dog, which, when triggered by the motion detectors "charges" out of the natural vegetation screen on a monorail (106) or other directional guide stabilized and attached to the ground be cross pieces (108). The enemy replica (110) can be attached to the monorail (106) by a monorail sleeve (109) which fits over the monorail (106). The monorail sleeve can be powered by either an internal motor (not shown in this figure) which is programmed to move the dog out to the end of the monorail and then return behind the vegetation screen, or a motor behind the vegetation screen could turn a screw-drive or chain and gear system, similar to a bicycle gear and chain, which would move the dog out along the monorail before returning it behind the vegetation screen. As the dog moves out from behind the vegetation screen, it can perform a variety of actions designed to frighten away the koi predator, including barking (112) and wagging its tail (111). These actions are performed by a motor/gear/lever combination inside the animal replica, which can be powered through the monorail or by a battery contained within the animal replica which is powered by solar panels located on the animal replica or be a connection with a charging system located in its resting state behind the vegetation screen.

FIG. 8 is a front, elevational view of the invention showing an iteration of the invention in which the enemy replica (132) moves out from a hiding place (136) behind a screen created by potted plants (129) or other vegetation when activated by the motion detection system, on a monorail (121) or other solid, linear type of directional guide, to frighten a koi predator, in which the invention circles around a pond (120) on the monorail. In this iteration, again the goal of the invention is to hide the enemy replica, in this case a dog (132), behind a plant (130) or other screening object, from view of a koi predator, and then, move the enemy replica out from behind its hiding place (136) when the koi predator triggers the motion detection system, which can be single directional units (128) or a system comprising a sender unit (125) and a receiver unit (126) between which passes a laser beam (127) or other means of communication between the sender unit (125) and receiver unit (126) which is undetectable to the koi predator prior to being triggered. The monorail (121) is held in place with cross pieces (122) which can be made of thick pieces of metal or other heavy compound such that the monorail is weighted down for stability, or can be pegged into the ground with stakes (123), nails, or screws. As the dog (132) moves around the monorail (121) in a direction indicated by number (135), it can perform a variety of actions design to frighten the koi predator, including barking (134) and wagging its tail (133).

Figure 9:
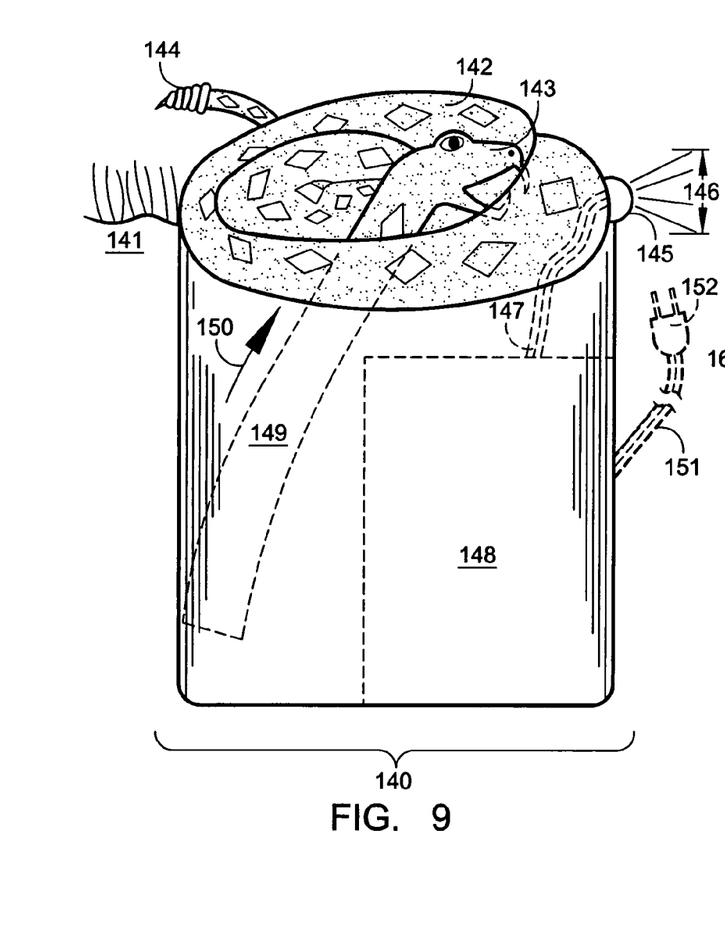
FIG. 9 is a front view of an iteration of the invention in which the enemy replica is a snake, showing the snake in its inactivated or resting position, in which the enemy replica sits on top of a container that is buried in the ground.

FIG. 9 is a front view of an iteration of the invention in which the enemy replica is built into the top of a container which houses the mechanical workings of the invention and is embedded in soil. Here, the iteration shows a snake in its inactivated or resting position, in which the enemy replica sits on top of a container (140) that is buried in the ground (141). The top of the container is actually the molded body of a rattlesnake (142), with a rattle (144) coming off one side, and a head (143) that appears to rest on top of the body (142). Embedded into the body of the rattlesnake (142) is a motion detection system, here shown as a single unit, radiative detector (145) which detects motion a certain distance at a certain angle (146) from the point of detection. Connecting the motion detector to a motor (148) contained within the container (140) is an electrical connector (147) which can be a standard electrical cord. Powering the motor is a source of power, in this figure illustrated by a electrical cord (151) terminating in a plug (152) which can be plugged into an electrical outlet. The motor (148) powers a neck (149) of the snake in an upward direction, indicated by number (150) when the motion detector detects movement near the invention.

Figure 10:
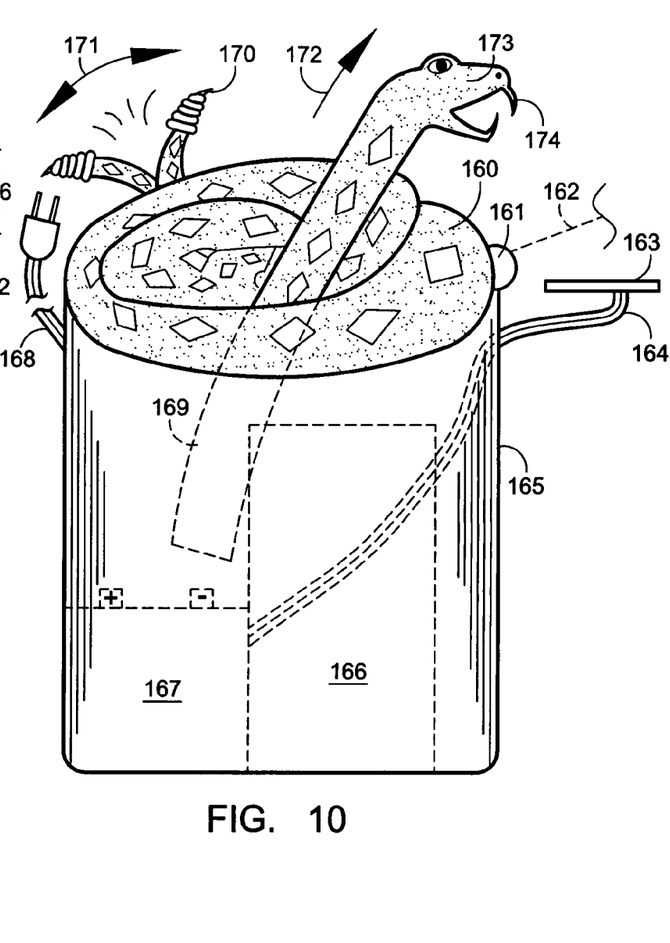

FIG. 10 is a front, elevational view of the iteration of FIG. 9 in its activated position. It should be noted that with this iteration as well as the others illustrated by the figures, the motions and actions can be triggered simultaneously, or one or more at a time in a programmed or random sequence. In this iteration, the motor (166) can be powered by an electrical cord (168) to an electrical outlet, or by one or more solar panels (163), connected by a solar panel electrical cord (164) to a battery (167) which stores energy from which the motor (166) can be run. With either method of obtaining power, the motion detector is triggered by motion of a koi predator, in this case a multiple system detection system comprising a motion detector (161) which emits a laser beam (162) which is received by another unit (not shown in this figure). The movement then causes the motor (166) moves the neck (169) of the snake in an upward direction (172), thereby exposing the snake head (173) which has an open mouth (174) which is design to frighten away the koi predator. The motor (166) also, when activated by the motion detector (161), turns a lever (not shown in this figure) which rotates the rattle (170) back and forth in a direction indicated by number (171). The rattle is constructed of a hollow shell with several metal or plastic particles contained with it such that as it moves it generates a sound similar to that made by a real rattlesnake.

What I claim is:

1. A device for deterring predators of koi and other ornamental fish from approaching an outdoor pond to feed on the fishing living therein, comprising:
   a motion detection system which can detect the movement of a koi predator, a source of energy, a motor powered by the source of energy, with a regulator which determines how much power reaches the motor for what length of time, an enemy replica which is a realistic or fanciful object designed to frighten away a koi predator, one or more motor-driven responses from the enemy replica, where the enemy replica moves upon a monorail and is attached to the monorail by a monorail sleeve or other method of attachment, where the monorail begins behind a screen and terminates a set distance away, where the movement of the enemy replica is controlled by the motor.

2. The device of claim 1, where the enemy replica can make one or more natural movements, such as a dog barking and waving its tail, as the enemy replica travels along the monorail.

3. The device of claim 1, where, the monorail is stabilized by a plurality of heavy cross pieces.

4. The device of claim 1, where, the motion detection system consists of one or more motion detectors which detect motion within a set angle extending outward from the motion detector and at a set distance in front of the motion detector, where the motion detectors are attached to the invention.

5. The device of claim 1, where, the motion detection system consists of one or more motion detectors which detect motion within a set angle extending outward from the motion detector and at a set distance in front of the motion detector, where the motion detectors are placed in locations where a user expects koi predators to walk, such as on the ground in front of the pond or on plants near the pond.

6. The device of claim 1, where, the motion detection system consists of two or more motion detectors which have an emitting and a receiving section, whereby the emitting section sends a laser beam or other invisible, low-energy means of communication with the emitting section of another unit of the invention, where the motion detectors are attached to the inventions, such that a triggering beam is set up between two units of the invention so that when a koi predator walks between the two units it "trips" the triggering beam, thereby activating both units of the invention, along with any other units that are networked into the triggered units.

7. The device of claim 1, where, the motion detection system consists of two or more motion detectors which have an emitting and a receiving section, whereby the emitting section sends a laser beam or other invisible, low-energy means of communication with the emitting section of another unit of the invention, where the motion detectors are located such that a series of motion detectors sets up an invisible "trip line" around the pond, such that a triggering beam is set up between two motion detectors so that when a koi predator walks between the two motion detectors it "trips" the triggering beam, thereby activating all units of the invention that are networked into the triggered motion detectors.

8. The device of claim 1, where, the enemy replica is a flat, molded piece of plastic with two, three, or four different forms of the enemy replica in segments which fold and attach to each other, creating a two, three, or four sided enemy replica which, when rotated by the motor in response to the motion detection system being triggered, shows the koi predator two, three, or four different "looks", depending on the number of forms of the enemy replica.

9. The device of claim 8, where, the enemy replica is an owl and the motor-driven response is, first, a series of turns, caused by the motor, which shows two, three, or four lifelike appearances for an owl, such as eyes either open or shut, ears lowered, partially raised, and fully raised, beaks opened and closed, wings raised and lowered, and, second, a hoot being generated from a sound emitting device located within a body cavity of the owl.

10. The device of claim 1, where, the screen comprises potted plants.

11. The device of claim 1, where, the screen comprises plants planted in the ground.

12. The device of claim 1, where, the motor-driven responses are a set sequence.

13. The device of claim 1, where, the motor-driven responses are random.

14. The device of claim 1, where, the enemy replica is an animal replica, and at least one of the one or more motor-driven responses from the animal replica is a movement natural to that type of animal.

15. The device of claim 1, where, the motion detection system consists of one or more motion detectors which detect motion within a set angle extending outward from the motion detector and at a set distance in front of the motion detector, where the motion detectors are attached to the invention, or, optionally, put in the ground at locations selected by the user, where the motion detectors are wired into the system.

16. The device of claim 1, where, the motion detection system consists of two or more motion detectors which have an emitting and a receiving section, whereby the emitting section sends a laser beam or other invisible, low-energy means of communication with the emitting section of another unit of the invention, where the motion detectors are attached to objects other than the enemy replica, but rather are placed by the user at strategic locations on nearby plants, pots, or in the ground, such that a triggering beam is set up between two units of the invention so that when a koi predator walks between the two units it "trips" the triggering beam, thereby activating both units of the invention, along with any other units that are networked into the triggered units.

17. The device of claim 1, where, the monorail extends in a circle around the pond rather than in a line which terminates, such that the enemy replica makes a circuit around the pond when it is activated.

18. The device of claim 17, where, the motion detection system consists of one or more motion detectors which detect motion within a set angle extending outward from the motion detector and at a set distance in front of the motion detector, where the motion detectors are attached to the invention.

19. The device of claim 17, where, the motion detection system consists of two or more motion detectors which have an emitting and a receiving section, whereby the emitting section sends a laser beam or other invisible, low-energy means of communication with the emitting section of another of the motion detectors, where the motion detectors are attached to objects other than the enemy replica, but rather are placed by the user at strategic locations on nearby plants, pots, or in the ground, such that a triggering beam is set up between two units of the invention so that when a koi predator walks between the two units it "trips" the triggering beam, thereby activating both units of the invention, along with any other units that are networked into the triggered units.

20. The device of claim 1, where, the enemy replica is realistic animal or fanciful object designed to frighten a koi predator, where, the enemy replica is hidden in a container embedded in the ground, where the container has a top that is in close proximity to the surface of the ground and a lip which extends over the side of the container, where the enemy replica can be raised or lowered on a track which fits into a hollow slot of the body of the enemy replica, where the track is supported by a support which is attached to the side of the container such that it remains in place while the enemy replica is moved up and down, where the enemy replica has a series of gear slots in its side which mesh with a gear which is powered by the motor such that when the motor is turned on the gear turns, which, in turn raises the enemy replica above the ground, where, upon being raised the enemy replica performs one or more motor-driven responses, where the motion detection system is attached to the top of the container and consists of one or more motion detectors which detect motion within a set angle extending outward from the motion detector and at a set distance in front of the motion detector.

21. The device of claim 1, where, the enemy replica is realistic representation of a snake, comprising, a hollow container which is designed to be embedded in to the ground, a container top where the enemy replica has a body portion that serves as the container top, a tail portion with rattles or a similar noise-making device, a head portion where the head has attached to it a neck portion which, in the invention's resting state, lies beneath the body portion and inside the cylinder, where, when activated, the motor causes the head portion to raise quickly, thereby exposing an open mouth of the snake, and, simultaneously, causing the rattles or other noise-making device to move and make noise, where the motion detection system is attached to the top of the container and consists of one or more motion detectors which detect motion within a set angle extending outward from the motion detector and at a set distance in front of the motion detector.

* * * * *